United States Patent [19]

Grigsby et al.

[11] Patent Number: 5,257,337

[45] Date of Patent: Oct. 26, 1993

[54] METHOD OF AND APPARATUS FOR EFFECTING AN END-TO-END FUSION SPLICE BETWEEN OPTICAL FIBRES

[75] Inventors: Richard Grigsby, Tarvin; Philip C. Longhurst, Bunbury, both of England

[73] Assignee: Bicc Public Limited Company, England

[21] Appl. No.: 844,517

[22] Filed: Mar. 2, 1992

[30] Foreign Application Priority Data

Mar. 8, 1991 [GB] United Kingdom ............... 9104951

[51] Int. Cl.$^5$ .............................................. G02B 6/38
[52] U.S. Cl. ........................................ 385/99; 385/96; 385/98; 219/121.12
[58] Field of Search ............... 385/99, 96, 98, 97; 219/121.11, 121.12, 121.16, 382, 383

[56] References Cited

U.S. PATENT DOCUMENTS

| 4,079,927 | 3/1978 | Rocton | 385/98 X |
|---|---|---|---|
| 4,252,407 | 2/1981 | Bubanko et al. | 350/96.21 |
| 4,662,962 | 5/1987 | Malavieille | 385/98 X |
| 4,717,233 | 1/1988 | Szkaradnik | 350/96.21 |
| 4,765,704 | 8/1988 | Pers | 385/97 X |
| 4,778,242 | 10/1988 | Ota et al. | 385/96 |
| 4,812,010 | 3/1989 | Osaka et al. | 385/99 X |
| 4,830,456 | 5/1989 | Kakii et al. | 350/96.20 |
| 4,861,133 | 8/1989 | Blume et al. | 385/99 |

FOREIGN PATENT DOCUMENTS

| 0098535 | 1/1984 | European Pat. Off. |
| 2846777 | 5/1980 | Fed. Rep. of Germany . |
| 3837953 | 5/1990 | Fed. Rep. of Germany . |
| 2300744 | 9/1976 | France . |
| 2-146507 | 6/1990 | Japan . |
| 1574044 | 9/1980 | United Kingdom . |

Primary Examiner—John D. Lee
Assistant Examiner—Phan T. Heartney
Attorney, Agent, or Firm—Anthony J. Casella; Gerald E. Hespos

[57] ABSTRACT

In effecting an end-to-end fusion splice between two optical fibres, the optical fibres are introduced into opposite ends of two support members so that parts of the optical fibres protrude from the members. The fibres are secured in the members and the protruding parts are cut to form tails of predetermined lengths. The support members are then arranged in axial alignment and one is caused to move axially towards the other until the end faces of the protruding tails are spaced a predetermined distance apart. Fusion splicing is then effected, the support members are permanently secured together and mechanical protection for the fusion splice is provided.

22 Claims, 3 Drawing Sheets

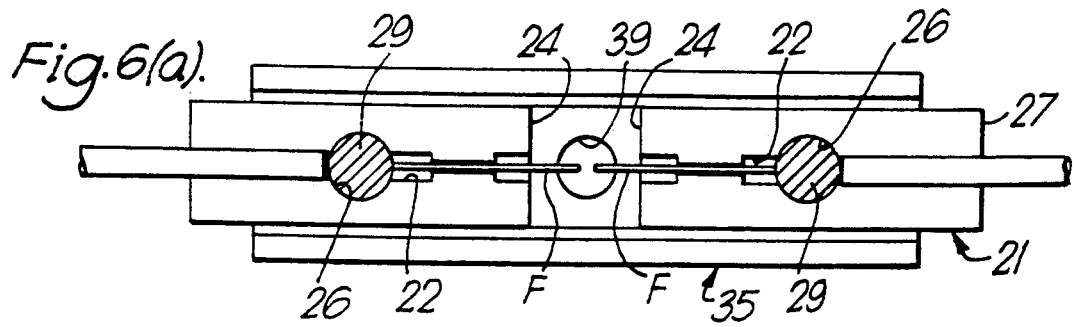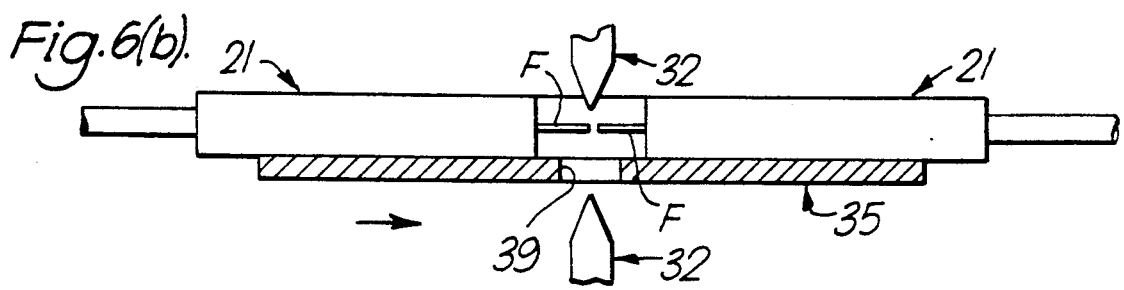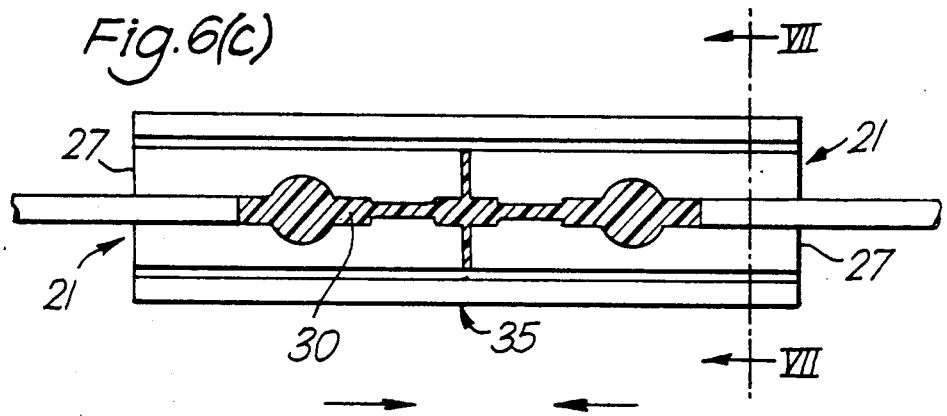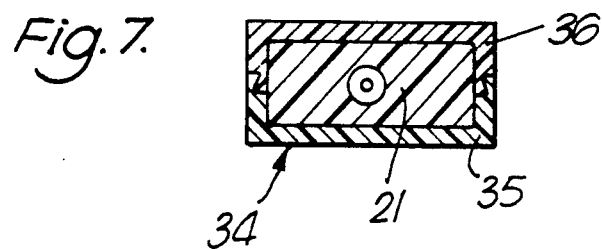

METHOD OF AND APPARATUS FOR EFFECTING AN END-TO-END FUSION SPLICE BETWEEN OPTICAL FIBRES

BACKGROUND OF THE INVENTION

This invention relates to end-to-end fusion splicing of optical fibres.

Many techniques differing from one another have been proposed for effecting an end-to-end fusion splice between a pair of optical fibres. An ideal fusion splicing technique should be capable of being readily used in the field by a semi-skilled operator and should reliably and repeatedly produce at any location satisfactory fusion splices.

It is an object of the present invention to provide an improved method of effecting an end-to-end fusion splice between at least one pair of optical fibres, which improved method can be readily and repeatedly effected and substantially reduces the risk that an unsatisfactory fusion splice will be made.

SUMMARY OF THE INVENTION

In the improved method according to the invention, one of the pair of optical fibres is introduced into one end of and is fed through an open-ended longitudinally extending throughbore in one of a pair of preformed substantially rigid support members so that a leading end part of the fibre protrudes from the other end of the member and the other of the pair of optical fibres is introduced into one end of and is fed through an open-ended longitudinally extending throughbore in the other of said pair of support members so that a leading end part of said other fibre protrudes from the other end of the other member, each throughbore over at least a part of its length at or near the end of the throughbore from which the leading end part of the fibre protrudes being of such a diameter that the optical fibre is a sliding fit therein; each optical fibre is so secured in the throughbore of the support member in which it is disposed that relative movement between the fibre and the support member is inhibited; the protruding leading end part of each optical fibre is so cleaved that the end face of the fibre is substantially flat and lies in a plane radial to the fibre axis and that a predetermined length of the fibre protrudes from the adjacent end of the support member; the pair of support members are arranged with their throughbores in substantially axial alignment and one or each member is caused to move axially towards the other member until the cleaved end faces of the protruding leading end parts of the optical fibres are spaced a predetermined distance apart; fusion splicing of the adjacent ends of the optical fibres is effected; and, after fusion splicing of the optical fibres has been effected, the pair of support members is permanently secured together and mechanical protection for the fusion splice is provided.

By virtue of the fact that the protruding end part of each optical fibre is not cleaved until after the optical fibre has been fed into and through the throughbore of its associated support member, there is negligible risk of any damage being effected to the end face of the fibre after the fibre has been cleaved and before fusion splicing of the optical fibres is effected. Furthermore, in addition to providing support for the aligned end parts of the optical fibres during the fusion splicing operation, the rigid elongate members at least in part also provide permanent mechanical protection for the fusion splice between the optical fibres.

Mechanical protection for the fusion splice may be provided by one or each of the pair of support members and, in this case, after the optical fibres have been introduced as described into the throughbores of the pair of support members, one or each of the optical fibres is temporarily secured in the throughbore of its support member and, after fusion splicing of the optical fibres has been effected, the means temporarily securing the or each optical fibre with respect to its support member is released and then one or each support member is caused to move axially towards the other member and relative to the spliced optical fibres until the neighbouring end faces of the support members abut or are spaced a predetermined distance apart. Where one or each support member is caused to move axially towards the other member and relative to the spliced optical fibres so that the neighbouring end faces abut, the neighbouring ends of the pair of support members may be so shaped that one effects a snap-fit with the other to provide mechanical protection for the fusion splice and to secure together permanently the pair of support members. Where one or each support member is caused to move axially towards the other member and relative to the spliced optical fibres so that the neighbouring end faces are spaced a predetermined distance apart, preferably any space between the support members is substantially filled with a curable material in a liquid or semi-liquid state and the curable material is permitted or caused to set to provide mechanical protection for the fusion splice and to secure together permanently the pair of support members.

Additionally, or alternatively, mechanical protection for the fusion splice may be provided by a preformed sleeve which is divided longitudinally of its length into two separately formed parts which are so shaped with respect to one another and with respect to the pair of support members that the two parts of the sleeve are locked together around the pair of support members in such a way that relative lengthwise movement between the support members and the surrounding two-part sleeve is prohibited. To this end, preferably each part of the two-part sleeve is of substantially channel shape with the longitudinally extending walls of one channel making a snap-fit with the longitudinally extending walls of the other channel and with one or each channel-shaped part having a transversely extending shoulder or transversely extending shoulders engaging with and preventing lengthwise movement of the pair of support members relative to the sleeve.

Each optical fibre may be secured in the throughbore of the support member in which it is disposed by any convenient means but preferably such securing of each optical fibre is effected by constraining the fibre against the wall of the throughbore at at least one position which is intermediate of the ends of the throughbore and at which the fibre and the throughbore are accessible without causing such microbending of the fibre that permanent unacceptable optical transmission loss results. For example, where an optical fibre is temporarily secured in the throughbore of its support member, a removable plug may be inserted in a transversely extending hole in the member intermediate of its ends to press and temporarily clamp the optical fibre against the wall of the throughbore.

Axial alignment of the pair of support members may be effected by any convenient means but in one preferred embodiment, the pair of support members is adapted to effect a sliding fit in a longitudinally extending channel in a surface of a preformed elongate body, a hole being provided in the bottom wall of the channel intermediate of the ends of the body to enable fusion splicing of at least one pair of optical fibres to be effected. In this latter case, a plug may be used to close the hole and the elongate body may form one part of said two-part sleeve for mechanical protection of the fusion splice. In a second preferred embodiment, each support member of the pair has a pair of elongate guides which extend substantially parallel to and which are disposed on diametrically opposite sides of the throughbore, the elongate guides of one support member engaging with the elongate guides of the other support member to constrain the support members with their throughbores in axial alignment. Preferably, the pair of elongate guides of each support member consists of a rectilinear pin which protrudes from the end face of the member and a rectilinear bore in the member for reception of the pin of the other support member.

To ensure that the end faces of the optical fibres are spaced apart by the required predetermined distance, preferably a transversely extending retractable stop of a predetermined width is introduced temporarily between the pair of support members against which the end faces of the support members are caused to abut when one or each member is caused to move axially towards the other member.

At each end of the throughbore in each of the pair of support members, the diameter of the throughbore may be locally increased, in one case to facilitate initial introduction of an optical fibre into the throughbore and in the other case to accommodate the fusion splice and/or curable material used for mechanically protecting the fusion splice and a part of an optical fibre immediately adjacent the fusion splice.

Preferably, the preformed substantially rigid elongate support members, and the two-part protective sleeve when employed, are made of a moulded plastics material.

Suitable curable materials that may be employed include an adhesive which is cured by ultra-violet radiation and a hot melt adhesive which sets on cooling.

The invention also includes apparatus for use in effecting an end-to-end fusion splice between at least one pair of optical fibres.

The invention further includes a mechanically protected optical fibre fusion splice made by the improved method hereinbefore described.

It is to be understood that the improved method and the improved apparatus of the present invention may be employed to effect end-to-end fusion splices between two or more pairs of optical fibres. The pairs of optical fibres to be fusion spliced may be separate with respect to one another and in this case the pair of preformed rigid support members employed will have two or more pairs of axially aligned throughbores for accommodating two or more pairs of optical fibres. Alternatively, the pairs of optical fibres to be fusion spliced may be optical fibres of two optical fibre ribbons whose fibres are to be fusion spliced and in this case the throughbore in each of the preformed rigid support members over at least said part of its length will be of a transverse cross-section such that one of said two optical fibre ribbons will be a sliding fit therein.

BRIEF DESCRIPTION OF THE DRAWINGS

The invention is further illustrated by a description, by way of example, of two preferred methods of effecting an end-to-end fusion splice between a pair of optical fibres with reference to the accompanying drawings, in which:

FIG. (a) to (c) illustrates the sequence of steps of said second preferred method, and FIG. 7 is a transverse cross-sectional view of the completed optical fibre splice taken on the line VII—VII in FIG. 6(c) with a snap fit two-part sleeve fitted therearound.

DETAILED DESCRIPTION OF THE PREFERRED EMBODIMENTS

Figure 1:
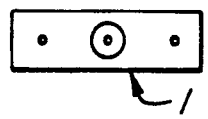
FIG. 1 is an end view of one of a pair of moulded plastics support members employed in the first preferred method of effecting an end-to-end fusion splice between a pair of optical fibers.

Referring to FIGS. 1 to 4, in the first preferred method of effecting an end-to-end fusion splice between a pair of optical fibres the apparatus employed comprises a pair of identical preformed rigid support members 1, a retractable stop 11 and a two-part sleeve 14 for enclosing the support members after the fusion splice has been effected to provide mechanical protection therefor. Each preformed rigid support member 1 is a moulded plastics elongate body of rectangular shape and rectangular cross-section having extending between its ends a central open-ended throughbore 2 end, disposed on diametrically opposite sides of and parallel to the central throughbore, a pair of throughbores 3, the axes of the throughbores 3 and the axis of the central throughbore 2 lying in a common plane. Over a part 5 of the length of the central throughbore 2 spaced from the mating end face 4 of each support member 1, the central throughbore is of such a diameter that an optical fibre will be a sliding fit therein and, at a position intermediate of the ends of the support member, a hole 6 extends transversely through one side of the support member and opens into the central throughbore, the purpose of which hole will be explained. The mating end face 4 and the opposite end face 7 of each support member 1 are flat and lie in planes extending radially with respect to the axis of the central throughbore 2. A rigid pin 8 is secured in one of the throughbores 3 of each support member 1 and protrudes from the mating end face 4, which pin is adapted to engage in the other of the throughbores 3 of the other support member. Detail of the other components of the apparatus will be apparent from the following description of the first preferred method of effecting an end-to-end fusion splice between a pair of optical fibres F.

Figure 2A:
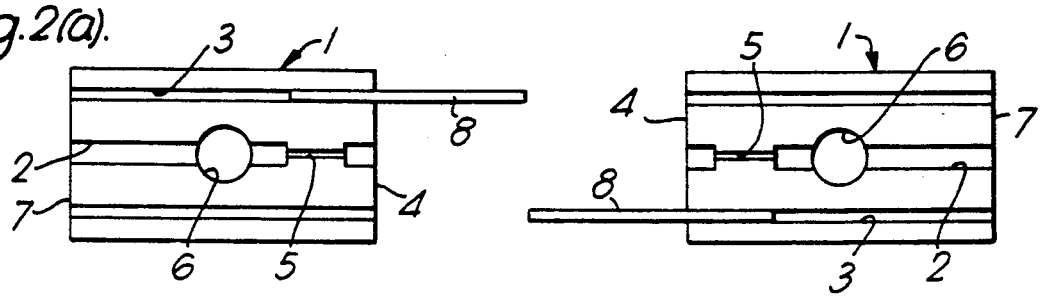
FIG. 2(a) to (g) illustrates the sequence of steps of said first preferred method.
Figure 2B:
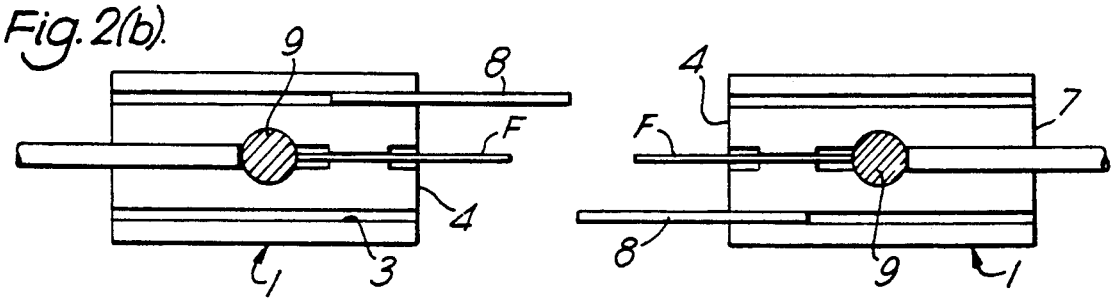
Figure 2C:
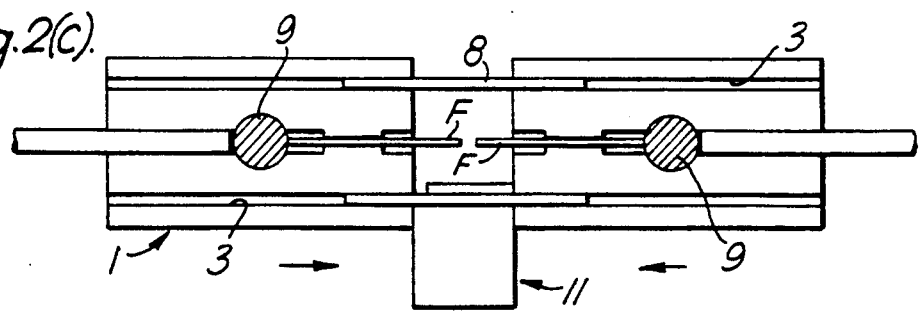
Figure 2D:
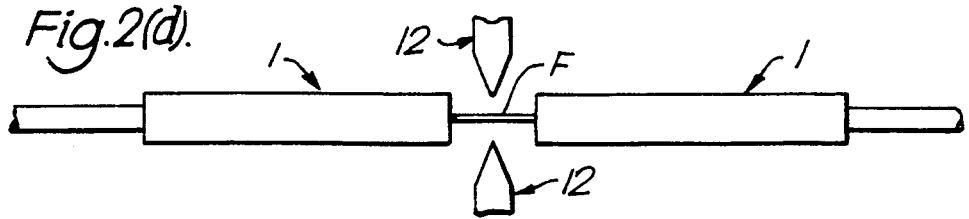
Figure 2E:
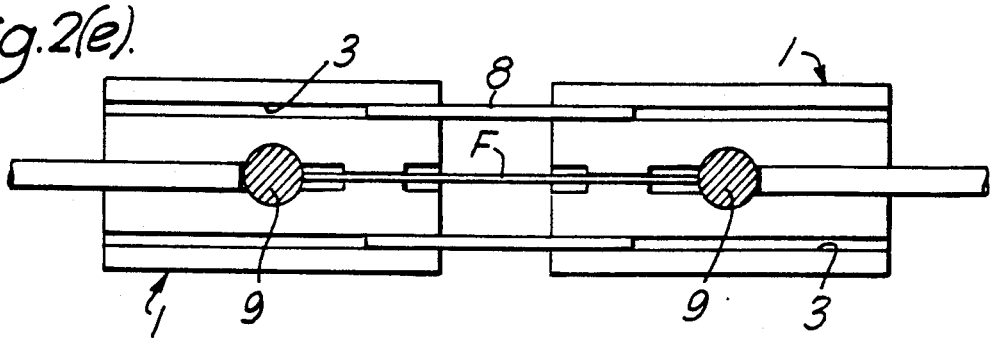
Figure 2F:
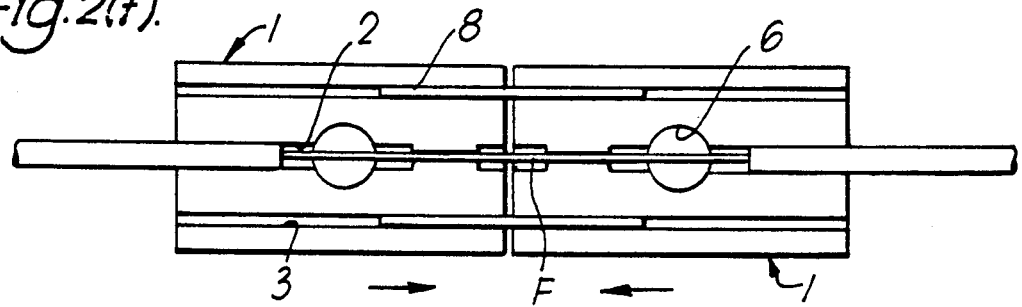
Figure 2G:
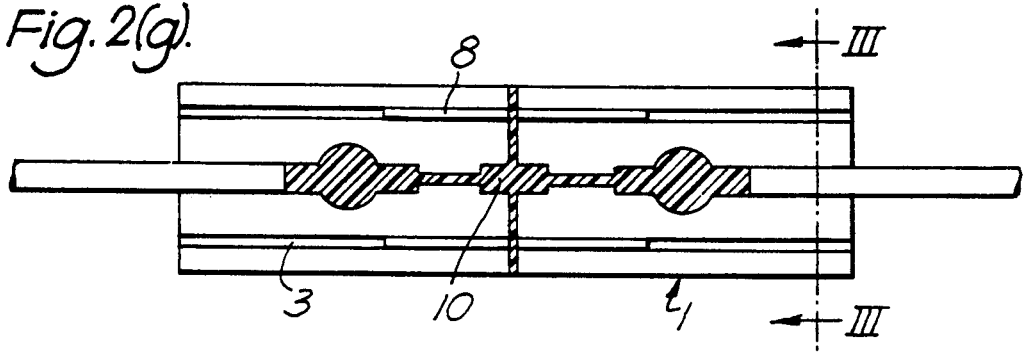
Figure 3:
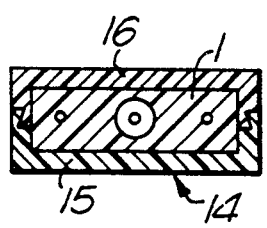
FIG. 3 is a transverse cross-sectional view of the completed optical fibre splice taken on the line III—III in FIG. 2(g) with a snap fit two-part sleeve fitted therearound.
Figure 4:
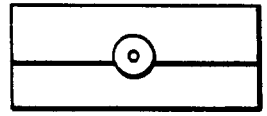
FIG. 4 is an end view of the completed optical fibre splice shown in FIG. 3.

In this first preferred method, one of the pair of optical fibres F is introduced into one end of the central throughbore 2 of one support member 1 at the end face 7 and is fed through the throughbore so that a leading end part of the fibre protrudes from the mating end face 4 and the other of the pair of optical fibres is introduced into one end of the central throughbore 2 of the other support member at the end face 7 and is fed through the throughbore so that a leading end part of the other fibre protrudes from the mating end face 4 of the other member (FIG. 2(b)). Each optical fibre F is temporarily secured in the central throughbore 2 of the support member 1 in which it is disposed by means of a removable plug 9 which is inserted in the transversely extending hole 6 to press and temporarily clamp the optical fibre against the wall of the throughbore without causing such microbending of the fibre that permanent unacceptable optical transmission loss results. The protruding leading end part of each optical fibre F is then cleaved so that the end face of the fibre is flat and lies in a plane radial to the fibre axis and that a predetermined length of the fibre protrudes from the mating end face 4 of the support member 1 in which it is disposed. The support members 1 are arranged with their central throughbores 2 in axial alignment and the retractable stop 11, which extends transversely with respect to the support members, is introduced temporarily between the mating end faces 4 of the support members in such a position that the mating end face of one support member abuts the stop. The other of the support members 1 is then caused to move axially towards the other support member, the rigid pin 8 of each support member engaging in the throughbore 3 of the other support member to maintain the central throughbores 2, and hence the optical fibres F temporarily clamped therein, in axial alignment. Movement of the support member 1 is arrested when its mating end face 4 abuts the stop 11 thereby ensuring that the cleaved end faces of the protruding leading end parts of the optical fibres F are spaced a predetermined distance apart (FIG. 2(c)). The retractable stop 11 is then withdrawn, and a fusion splice is effected between the adjacent ends of the optical fibres F by electrodes 12 (FIG. 2(d) and (e)). After fusion splicing of the optical fibres F has been effected, the plugs 9 are removed and each support member 1 is caused to move axially towards the other member and relative to the spliced optical fibres F until the mating end faces 4 of the support members are spaced a predetermined distance apart (FIG. 2(f)). Thereafter, a curable material 10 in a liquid or semi-liquid state is introduced into the space between the support members 1 and hence into end parts of the central throughbores 2 opening into the mating end faces 4 and into the holes 6 and is permitted or caused to set. Mechanical protection for the spliced optical fibres F is further provided by the preformed plastics sleeve 14 which is divided longitudinally of its length into two separately formed parts 15, 16 each of channel-shaped cross-section and closed at each end by an end wall 17, 18 having a semi-circular recess centrally disposed in that one of its edges which will abut an edge of an end wall of the other channel-shaped part (FIGS. 3 and 4). The separately formed parts 15, 16 of the sleeve 14 are assembled around the pair of support members 1 with the longitudinally extending walls of the channel of one part making a snap-fit with the longitudinally extending walls of the channel of the other part and with the end walls 17, 18 abutting the end faces 7 of the support members so that relative lengthwise movement between the support members and the sleeve is prohibited.

Figure 5:
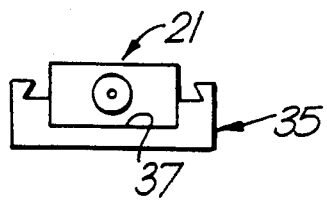
FIG. 5 is an end view of one of a pair of moulded plastics support members and of a moulded plastics elongate body employed in the second preferred method of effecting an end-to-end fusion splice between a pair of optical fibres.

Referring to FIGS. 5 to 7, in the second preferred method of effecting an end-to-end fusion splice between a pair of optical fibres the apparatus employed comprises a pair of identical preformed rigid support members 21, a preformed elongate body 35 of channel-shaped cross-section, a retractable stop (not shown) and a two-part sleeve 34 for enclosing the support members after the fusion splice has been effected to provide mechanical protection therefor. Each preformed rigid support member 21 is a moulded plastics elongate body of rectangular shape and rectangular cross-section having extending between its ends a central open-ended throughbore 2. As in the support members 1 of the apparatus described with reference to FIGS. 1 to 4, over a part of the length of the central throughbore 22 spaced from the mating end face 24 of each support member 21, the central throughbore is of such a diameter that an optical fibre will be a sliding fit therein and, at a position intermediate of the ends of the support member, a hole 26 extends transversely through one side of the support member and opens into the central throughbore. The mating end face 24 and the opposite end face 27 of each support member 21 are flat and lie in planes extending radially with respect to the axis of the central throughbore 22. The support members 21 are sliding fits in the open-ended channel 37 of the preformed elongate body 35 which is made of moulded plastics material and which has in the bottom wall of the channel intermediate of the ends of the body a hole 39 to enable fusion splicing of the optical fibres to be effected by electrodes 32. Detail of the other components of the apparatus will be apparent from the following description of the second preferred method of effecting an end-to-end fusion splice between a pair of optical fibres F.

In the second preferred method, one of the pair of optical fibres F is introduced into one end of the central throughbore 22 of one support member 21 at the end face 27 and is fed through the throughbore so that a leading end part of the fibre protrudes from the mating end face 24 and the other of the pair of optical fibres is introduced into one end of the central throughbore 22 of the other support member at the end face 27 and is fed through the throughbore so that a leading end part of the other fibre protrudes from the mating end face 24 of the other member. Each optical fibre F is temporarily secured in the central throughbore 22 of the support member 21 in which it is disposed by means of a removable plug 29 which is inserted in the transversely extending hole 26 to press and temporarily clamp the optical fibre against the wall of the throughbore without causing such microbending of the fibre that permanent unacceptable optical transmission loss results. The protruding leading end part of each optical fibre F is then cleaved so that the end face of the fibre is flat and lies in a plane radial to the fibre axis and that a predetermined length of the fibre protrudes from the mating end face 24 of the support member 21 in which it is disposed. The support members 21 are engaged in opposite ends of the channel 37 of the elongate body 35 and the retractable stop, which extends transversely with respect to the support members, is introduced temporarily between the mating end faces 24 of the support members in such a position that the mating end face of one support member abuts the stop. The other of the support members 21 is then slid towards the other support member with the protruding leading end parts of the optical fibres F in axial alignment until its mating end face 24 abuts the stop thereby ensuring that the cleaved end faces of the protruding leading end parts of the optical fibres are spaced a predetermined distance apart above the hole 39 in the bottom of the channel 37 of the elongate body (FIG. 6(a)). The retractable stop is then withdrawn, and an arc is struck between the electrodes 32, which arc passes through the hole 39 in the bottom of the channel 37 of the body 35 and effects a fusion splice between the adjacent ends of the optical fibres F (FIG. 6(b)). After fusion splicing of the optical fibres F has been effected, the plugs 29 are removed and each support member 21 is slid in the channel 37 of the elongate body 35 axially towards the other member relative to the spliced optical fibres F until the mating end faces 24 of the support members are spaced a predetermined distance apart (FIG. 6(c)). Curable material 30 in a liquid or semi-liquid state is then introduced into the space between the support members 21, and hence into end parts of the central throughbores 22 opening into the mating end faces 24 and into the holes 26, and is permitted or caused to set so that the spliced optical fibres are permanently secured in the support members and the support members are permanently secured together. Thereafter, mechanical protection for the spliced optical fibres F is provided by the preformed plastics sleeve 34 which is divided longitudinally of its length into two parts, one of which is the elongate body 35 and the other of which is a lid 36 of channel-shaped cross-section closed at each of its ends by an end wall having a semi-circular recess centrally disposed in its transversely extending free edge. The lid 36 is applied over the elongate body 35 with the longitudinally extending walls of the channel 37 of the body making a snap-fit with the longitudinally extending walls of the channel of the lid and with the end walls of the lid abutting the end faces 27 of the support members and parts of the end faces of the elongate body so that relative lengthwise movement between the support members and the sleeve is prohibited.

What we claim as our invention is:

1. A method of effecting an end-to-end fusion splice between at least one pair of optical fibres, which method comprises introducing one of the pair of optical fibres into one end of and feeding it through an open-ended longitudinally extending throughbore in one of a pair of preformed substantially rigid support members so that a leading end part of the fibre protrudes from the other end of the member and introducing the other of the pair of optical fibres into one end of and feeding it through an open-ended longitudinally extending throughbore in the other of said pair of support members so that a leading end part of said other fibre protrudes from the other end of the other member, each throughbore over at least a part of its length near the end of the throughbore from which the leading end part of the fibre protrudes being of such a diameter that the optical fibre is a sliding fit therein; so securing each optical fibre in the throughbore of the support member in which it is disposed that relative movement between the fibre and the support member is inhibited; so cleaving the protruding leading end part of each optical fibre that the end face of the fibre is substantially flat and lies in a plane radial to the fibre axis and that a predetermined length of the fibre protrudes from the adjacent end of the support member; arranging the pair of support members with their throughbores in substantially axial alignment and causing at least one of the members to move axially towards the other member until the cleaved end faces of the protruding leading end parts of the optical fibres are spaced a predetermined distance apart; effecting a fusion splice between the adjacent ends of the optical fibres; and, after fusion splicing of the optical fibres has been effected, permanently securing the pair of support members together and providing mechanical protection for the fusion splice.

2. A method as claimed in claim 1, wherein securing of at least one of the optical fibres in the throughbore of the support member in which it is disposed is temporary and, after fusion splicing of the optical fibres has been effected, the means temporarily securing said optical fibre with respect to its support member is released and at least one of the support members is caused to move axially towards the other member and relative to the spliced optical fibres until its end face is at a predetermined position with respect to the neighbouring end face of the other member.

3. A method as claimed in claim 2 in which at least one of support members is caused to move axially towards the other member and relative to the spliced optical fibres so that the neighbouring end faces of the members are spaced a predetermined distance apart, wherein any space between the support members is substantially filled with a curable material in a liquid or semiliquid state and the curable material is permitted or caused to set to provide mechanical protection for the fusion splice and to secure together permanently the pair of support members.

4. A method as claimed in claim 3, wherein the curable material employed is an adhesive which is cured by ultraviolet radiation.

5. A method as claimed in claim 3, wherein the curable material employed is a hot melt adhesive which sets on cooling.

6. A method as claimed in claim 1, wherein each optical fibre is secured in the throughbore of the support member in which it is disposed by constraining the fibre against the wall of the throughbore at at least one position which is intermediate of the ends of the throughbore and at which the fibre and the throughbore are accessible without causing such microbending of the fibre that permanent unacceptable optical transmission loss results.

7. A method as claimed in claim 1, wherein each optical fibre is temporarily secured in the throughbore of the support member in which it is disposed by inserting a removable plug in a transversely extending hole in the member intermediate of its ends to press and temporarily clamp the optical fibre against the wall of the throughbore without causing such microbending of the fibre that permanent unacceptable optical transmission loss results.

8. A method as claimed in claim 7, wherein axial alignment of the pair of support members is effected by causing the support members to make a sliding fit in a longitudinally extending channel in a surface of a preformed elongate body, fusion splicing of the optical fibres being effected through a hole in the bottom wall of the channel intermediate of the ends of the body.

9. A method as claimed in claim 8, wherein, after fusion splicing has been effected, the hole in the bottom wall of the channel is closed by a plug and the fusion splice is mechanically protected by assembling around the pair of support members a two-part sleeve comprising said elongate body and a separately formed part which lock together in such a way that relative lengthwise movement between the support members and the surrounding two-part sleeve is prohibited.

10. A method as claimed in claim 1, wherein mechanical protection for the fusion splice is provided by assembling around the pair of support members a preformed sleeve which is divided longitudinally of its length into two separately formed parts which are so shaped with respect to one another and with respect to the pair of support members that the two parts of the sleeve are locked together in such a way that relative lengthwise movement between the support members and the surrounding two-part sleeve is prohibited.

11. A method as claimed in claim 1, wherein a transversely extending retractable stop of a predetermined width is introduced temporarily between the pair of support members against which the end faces of the support members are caused to abut when at least one of the members is caused to move axially towards the other member, thereby ensuring that the end faces of the optical fibres are spaced apart by the required predetermined distance.

12. A mechanically protected optical fibre fusion splice made by the method claimed in claim 1.

13. Apparatus for use in effecting an end-to-end fusion splice between at least one pair of optical fibres, which apparatus comprises a pair of preformed substantially rigid support members each having an open-ended longitudinally extending throughbore and means for constraining said support members to move towards or away from one another with their throughbores in substantially axial alignment, the throughbore of each support member over at least a part of the length of the throughbore near the end of the throughbore nearer the other support member having one of said pair of optical fibers slidingly hit therein.

14. Apparatus as claimed in claim 13, wherein said constraining means comprises a preformed elongate body having in a surface of the body a longitudinally extending channel in which the support members are sliding fits, the bottom wall of the channel having intermediate of the ends of the body a hole to enable fusion splicing of at least one pair of optical fibres is to be effected.

15. Apparatus as claimed in claim 13, which apparatus also includes, for introducing temporarily between the pair of support members, a transversely extending retractable stop of a predetermined width against which the end faces of the support members will be caused to abut when at least one of the members is caused to move axially towards the other member, thereby to ensure that the end faces of the optical fibres are spaced apart by the required predetermined distance.

16. Apparatus as claimed in claim 13, wherein, at each end of the throughbore in each of the pair of support members, the diameter of the throughbore is locally increased, in one case to facilitate initial introduction of an optical fibre into the throughbore and in the other case to accommodate the fusion splice and curable material to be used for mechanically protecting the fusion splice and a part of an optical fibre immediately adjacent to the fusion splice.

17. Apparatus as claimed in claim 13, wherein the preformed substantially rigid elongate support members are made of a moulded plastics material.

18. Apparatus for use in effecting an end-to-end fusion splice between at least one pair of optical fibres, which apparatus comprises a pair of preformed substantially rigid support members each having an open-ended longitudinally extending throughbore and a preformed elongate body having in a surface of the elongate body a longitudinally extending channel in which the support members are sliding fits and are constrained to move towards or away form one another with their throughbores in substantially axial alignment, the throughbore of each support member over at least a part of the length of the throughbore near the end of the throughbore nearer the other support member being of such a diameter that an optical fibre will be a sliding fit therein, the bottom wall of the channel of the elongate body having intermediate of the ends of the elongate body a hole to enable fusion splicing of at least one pair of optical fibres to be effected, the elongate body constituting one part of a preformed sleeve which is divided longitudinally of its length into two separately formed parts, and the elongate body and the other part of the sleeve being so shaped with respect to one another and with respect to the pair of support members that the two parts of the sleeve can be locked together around the pair of support members in such a way that relative lengthwise movement between the support members and the surrounding two-part sleeve is prohibited.

19. Apparatus as claimed in claim 18, wherein each part of the two-part sleeve is of substantially channel shape with the longitudinally extending walls of one channel adapted to make a snap fit with the longitudinally extending walls of the other channel and with at least one channel shaped part having at least one transversely extending shoulder adapted to engage with and prevent lengthwise movement of the pair of support members relative to the sleeve.

20. Apparatus for use in effecting an end-to-end fusion splice between at least one pair of optical fibres, which apparatus comprise a pair of preformed substantially rigid support members each having an open-ended longitudinally extending throughbore and a pair of elongate guides which extend substantially parallel to and which are disposed on diametrically opposite sides of the throughbore of each support member, the elongate guides of one support member being adapted to engage with the elongate guides of the other support member to constrain the support members with their throughbores in axial alignment, the throughbore of each support member over at least a part of the length of the throughbore near the end of the throughbore nearer the other support member being of such a diameter that an optical fibre will be a sliding fit therein.

21. Apparatus as claimed in claim 20, wherein the pair of elongate guides of each support member consists of a rectilinear pin which protrudes from the end face of the member and a rectilinear bore in the member for reception of the pin of the other support member.

22. Apparatus as claimed in claim 20, which apparatus also includes a preformed sleeve which is divided longitudinally of its length into two separately formed parts, the two parts of the sleeve being so shaped with respect to one another and with respect to the pair of support members that the two parts of the sleeve can be locked together around the pair of support members in such a way that relative lengthwise movement between the support members and the surrounding two part sleeve is prohibit-ed.

* * * * *